United States Patent
Citti (10) Patent No.: US 11,772,713 B2
(45) Date of Patent: Oct. 3, 2023

(54) SYSTEM FOR PRODUCING A CONTAINING STRUCTURE FOR VEHICLES WITH CABS OR THE LIKE, METHOD AND VEHICLE OBTAINED WITH SAID STRUCTURE

(71) Applicant: REVO.STRUCT S.R.L.S., Taormina (IT)

(72) Inventor: Michele Citti, Lucca (IT)

(73) Assignee: REVO.STRUCT S.R.L.S., Taormina (IT)

(*) Notice: Subject to any disclaimer, the term of this patent is extended or adjusted under 35 U.S.C. 154(b) by 94 days.

(21) Appl. No.: 17/419,483

(22) PCT Filed: Dec. 23, 2019

(86) PCT No.: PCT/IB2019/061280
§ 371 (c)(1),
(2) Date: Jun. 29, 2021

(87) PCT Pub. No.: WO2020/141405
PCT Pub. Date: Jul. 9, 2020

(65) Prior Publication Data
US 2022/0073153 A1 Mar. 10, 2022

(30) Foreign Application Priority Data
Dec. 31, 2018 (IT) .................. 102018000021457

(51) Int. Cl.
*B62D 33/04* (2006.01)
*B62D 27/02* (2006.01)

(52) U.S. Cl.
CPC .......... *B62D 27/023* (2013.01); *B62D 33/04* (2013.01)

(58) Field of Classification Search
CPC .... B62D 27/023; B62D 33/04; B62D 23/005; B62D 27/026; B62D 33/044
USPC .................................. 296/29, 30, 191, 205
See application file for complete search history.

(56) References Cited

U.S. PATENT DOCUMENTS

| | | | |
|---|---|---|---|
| 5,421,666 A | 6/1995 | Spears | |
| 7,931,326 B2* | 4/2011 | Beshiri | B60J 7/102 296/100.18 |
| 10,183,559 B2* | 1/2019 | DeMonte | B60J 7/185 |
| 2013/0175828 A1 | 7/2013 | White et al. | |
| 2014/0286695 A1* | 9/2014 | Jocham | F16B 12/44 403/205 |
| 2021/0261197 A1* | 8/2021 | Czinger | B22F 7/08 |

FOREIGN PATENT DOCUMENTS

| | | |
|---|---|---|
| CN | 106080805 A | 11/2016 |
| DE | 102007018183 A1 | 5/2008 |
| EP | 2236395 A1 | 10/2010 |

* cited by examiner

*Primary Examiner* — Dennis H Redder
(74) *Attorney, Agent, or Firm* — McGlew and Tuttle, P.C.

(57) ABSTRACT

There is described a system for assembling a frame for a containing structure adapted to be mounted on a vehicle chassis. The system comprises a plurality of joints, each having a central core and a plurality of arms extending from the central core and forming securing members for a respective plurality of segments of tubular profile.

19 Claims, 10 Drawing Sheets

SYSTEM FOR PRODUCING A CONTAINING STRUCTURE FOR VEHICLES WITH CABS OR THE LIKE, METHOD AND VEHICLE OBTAINED WITH SAID STRUCTURE

TECHNICAL FIELD

The present invention relates to the sector of industrial and commercial vehicles. More in particular, the present invention relates to structures and methods for producing cabs or other containing structures to be mounted on flatbeds or chassis of vehicles or their trailers.

BACKGROUND ART

Motor vehicles comprising a chassis on which a containing structure is mounted are available for a variety of applications. Vehicles of this type are normally produced by modifying a standard vehicle, manufactured by a vehicle manufacturer, which has a driver's cab, a flatbed or frame, an engine, axles and wheels, as well as steering systems for the front wheels and motion transmission systems from the engine to the driving wheels. Containing structures of various types are applied on the flatbed or frame of the chassis thus formed to obtain transport vehicles suitably equipped for a plurality of uses. By way of non-limiting example, emergency vehicles, such as ambulances or the like, service vehicles of various types, mobile shops, mobile workshops and other vehicles for a wide range of commercial and professional uses can be produced by combining a chassis to a containing structure of various type.

Containing structures must comply with strict requirements of static and dynamic strength. In particular, containing structures must have a frame capable of withstanding dynamic loads that are generated not only during normal driving of the vehicle, caused by irregularities in the ground, but also simple accelerations and decelerations due to driving conditions. The structures must also withstand dynamic loads resulting from front or rear impacts (for example, rear-end collisions), and also side impacts. Accelerations in the direction of travel or transverse accelerations to which the vehicle is subjected must not cause significant deformations of the structure.

Containing structures with high mechanical performances are typically made of metal frames, by welding sections of metal profiles, for example in aluminum. The structure must be assembled by highly skilled personnel, capable of performing cutting and welding operations of the single segments of profile in a workmanlike manner, to obtain a final structure that satisfies the required mechanical properties. These construction procedures are therefore lengthy and costly, and the client is obliged to wait a long time between the definition date of the project of the containing structure and the delivery date of the vehicle.

Therefore, there is the need to provide an alternative system for producing containing structures for commercial and industrial vehicles, which entirely or partially overcomes one or more of the problems of current state of the art systems.

SUMMARY OF THE INVENTION

To overcome the limits and drawbacks of the current state of the art, there is proposed a system for assembling a frame for a containing structure adapted to be mounted on a vehicle chassis, said system comprising a plurality of joints and a plurality of segments of tubular profile adapted to be joined in a lattice structure having a three-dimensional configuration by means of the aforesaid joints. Each joint has a central core and a plurality of arms extending from the central core and forming securing members for a respective plurality of segments of tubular profile. The arms and the segments of tubular profile have a quadrangular cross section. Moreover, the joints are advantageously made of molded polymer material, preferably charged with reinforcing fibers or in any case suitable for metal replacement. The joints advantageously have an inner volume filled by a lattice lightening and stiffening structure. For each joint there are provided closing covers of open faces of the arms, adapted to form, with remaining faces of the respective arm, a continuous outer surface.

As will be apparent below, all the segments of tubular profile can be rectilinear. By assembling the components of the system defined above, a three-dimensional structure comprising a plurality of nodes is obtained. Each node is the point of convergence of two or more rectilinear tubular segments. Each node is provided with a joint of the type defined above, which forms the connecting element of the segments of tubular profile converging in the respective node.

To obtain frames of containing structures with a three-dimensional configuration in which each node of the frame is formed by a joint with arms that join all the segments of tubular profile converging in the respective node to one another, the system advantageously contains one or more joints of each of the following types of joints:

L-shaped joints with two arms oriented at 90° with respect to each other;
X-shaped joints with four coplanar arms oriented at 90° with respect to one another;
T-shaped joints with three coplanar arms;
joints with three arms arranged according to three Cartesian axes;
four-way joints with three arms arranged coplanar in the shape of a T and a fourth arm extending orthogonally to the plane on which the three coplanar arms lie.

Particularly advantageous embodiments and characteristics of possible embodiments are described below and defined in the appended claims.

In addition to the aforesaid system, the invention also relates to a containing structure for vehicles and a vehicle comprising a chassis and a structure obtained with the system described herein.

The present invention also relates to a method for producing a containing structure for vehicles by means of the use of a system of the aforesaid type.

BRIEF DESCRIPTION OF THE DRAWINGS

The invention will be better understood by following the description and the accompanying drawings, which illustrate an exemplifying and non-limiting embodiment of the invention. More particularly, in the drawings.

DETAILED DESCRIPTION OF EMBODIMENTS

Figure 1:
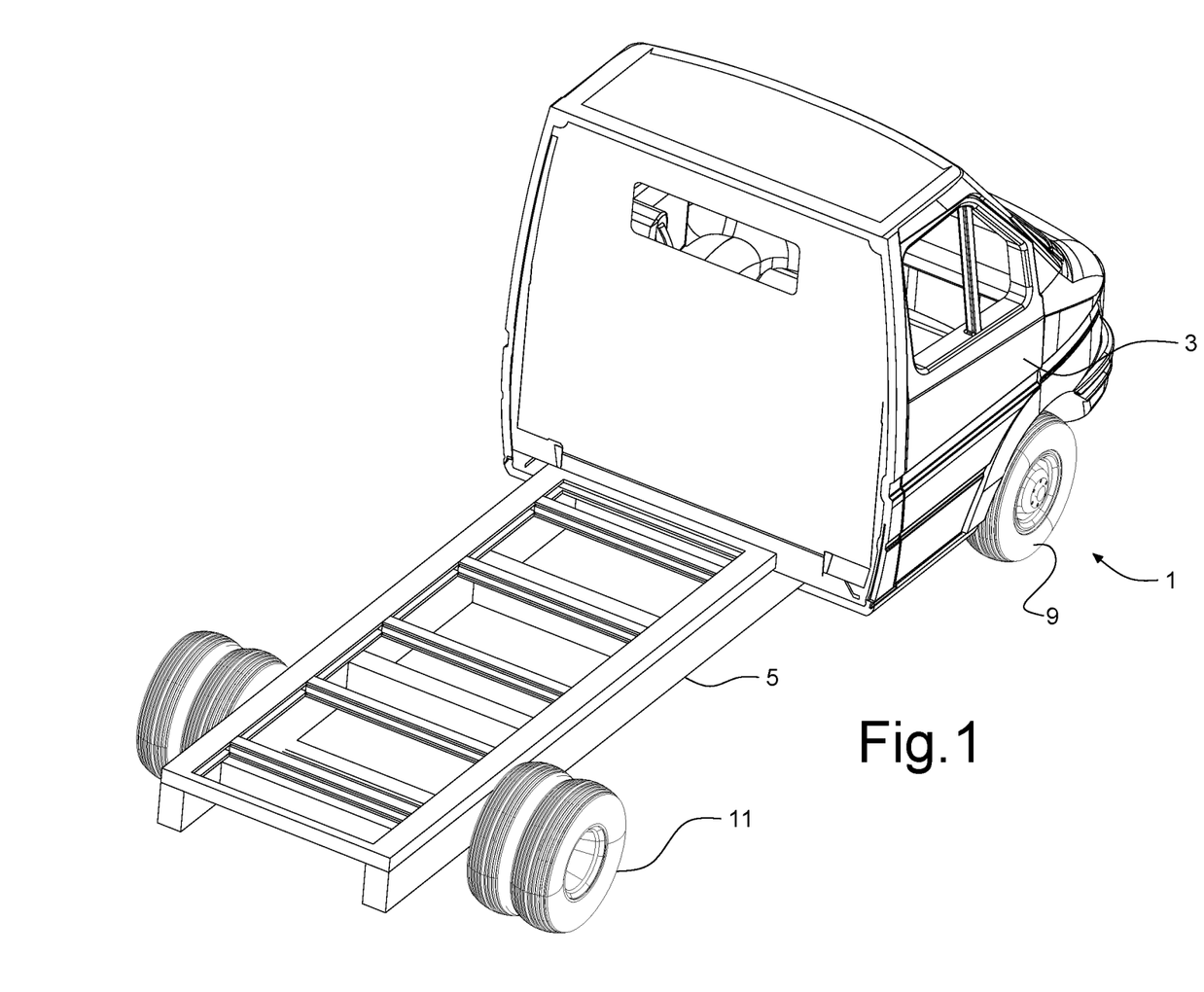
FIG. 1 shows an axonometric view of a chassis for producing a commercial vehicle with a containing structure.

FIG. 1 schematically indicates a chassis 1 of a vehicle that can be equipped with a containing structure, hereinafter for brevity also "cell", which can be produced with the system of the present invention. The chassis 1 comprises a driver's cab 3, a supporting frame 5, front wheels 9 and rear wheels 11. An engine, not shown, and a transmission system (not shown) of the torque from the engine to the driving wheels, typically the rear wheels 11, are also provided.

Although in the illustrated example the chassis relates to a motorized vehicle, in other embodiments the chassis could be part of a towed vehicle, for example of a trailer.

Figure 2:
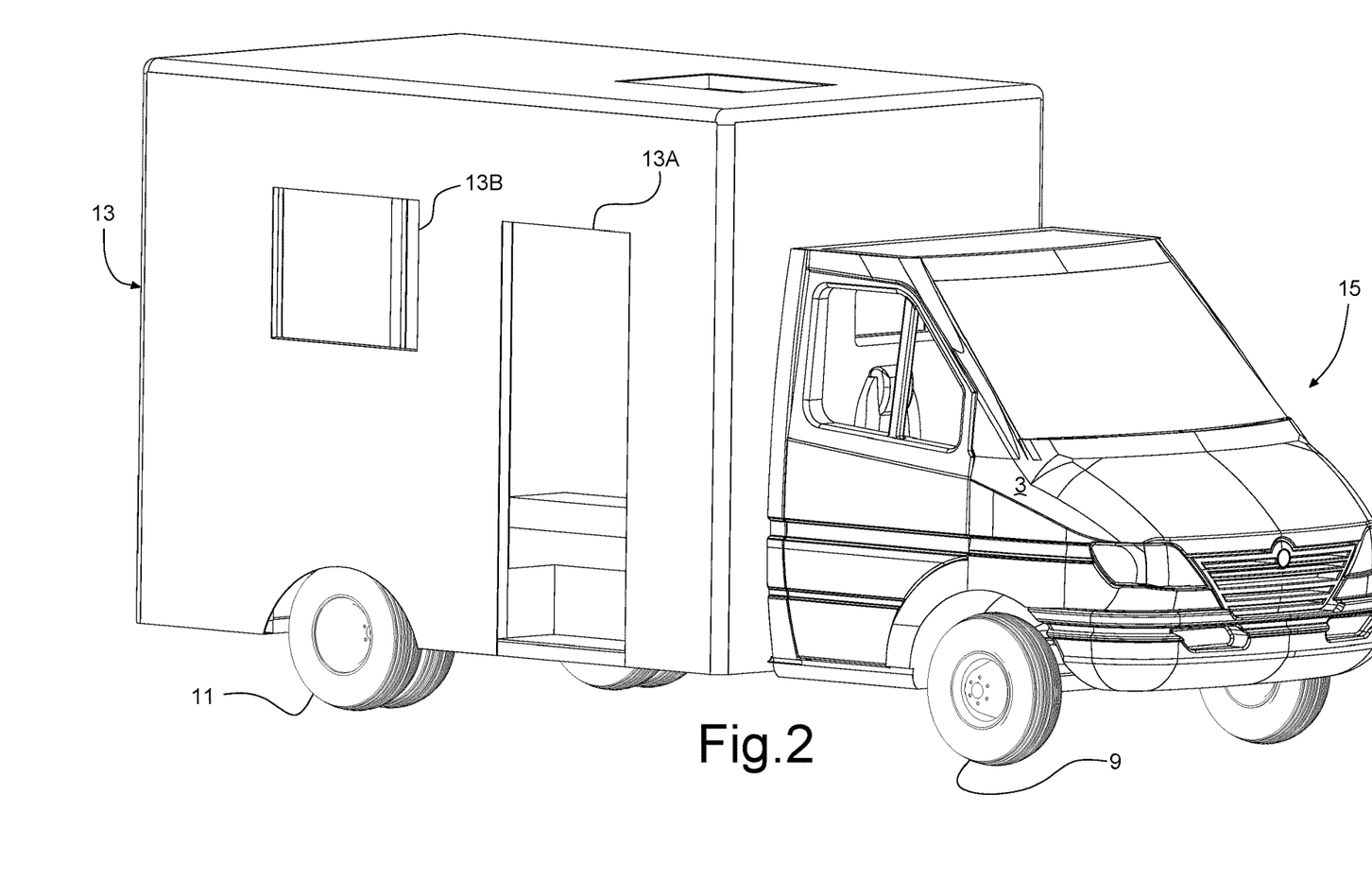
FIG. 2 shows an axonometric view of a vehicle comprising the chassis of FIG. 1 and a containing structure, or cell, applied on the chassis.

A cell or containing structure 13 is mounted on the frame 5 of the chassis 1, to obtain a vehicle 15, see FIG. 2. In the illustrated exemplary embodiment, the cell 13 comprises a side access opening 13A, an optional rear access opening and a window 13B. It must be understood that the shape and the dimension of the containing structure 13 and of its openings can vary as a function of the uses for which the vehicle 15 is intended and of the shape and size of the chassis.

Figure 3:
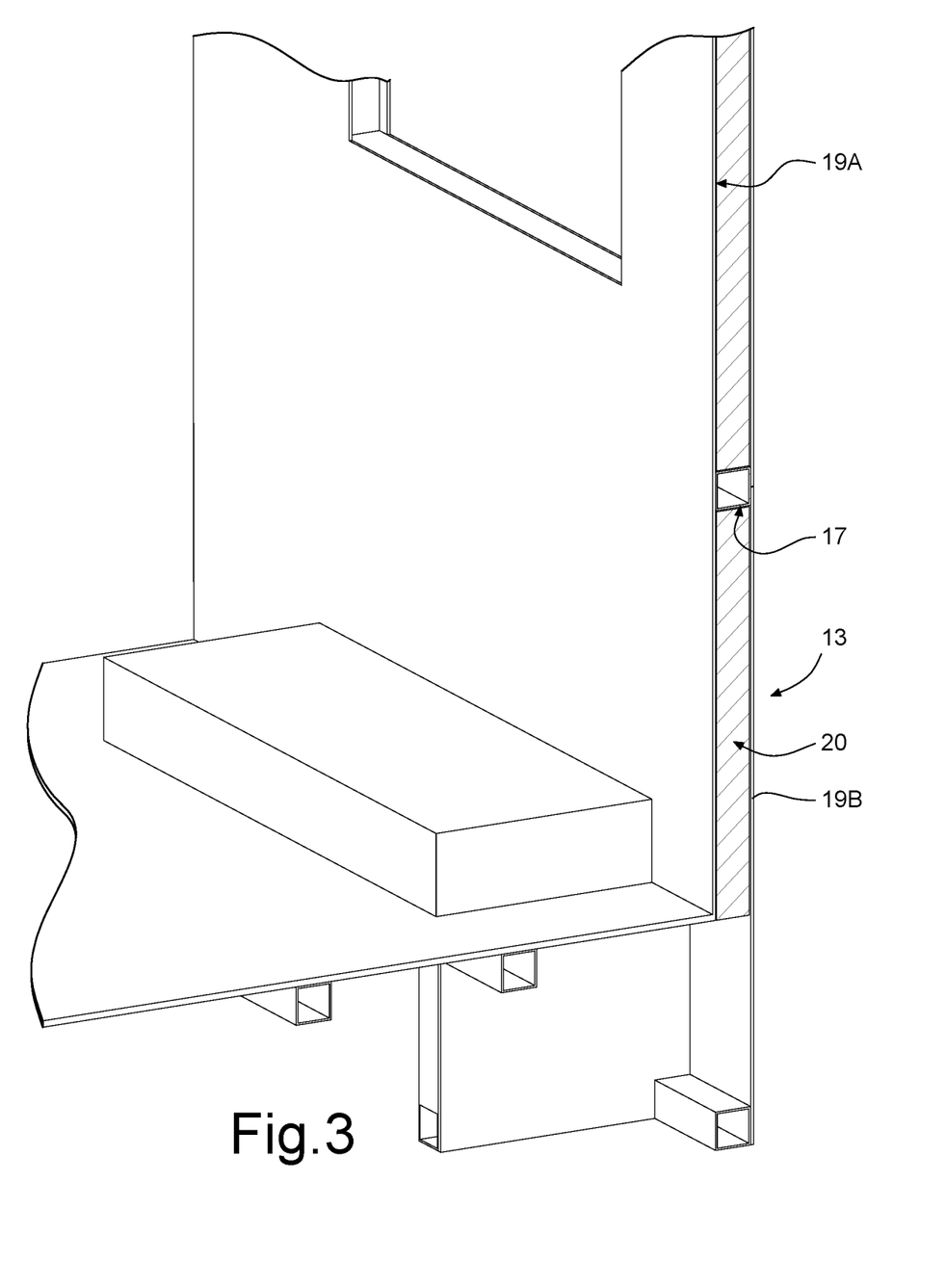
FIG. 3 shows a sectional view of a detail of a wall of the containing structure, with a portion of the inner frame and inner and outer cladding panels.
Figure 4:
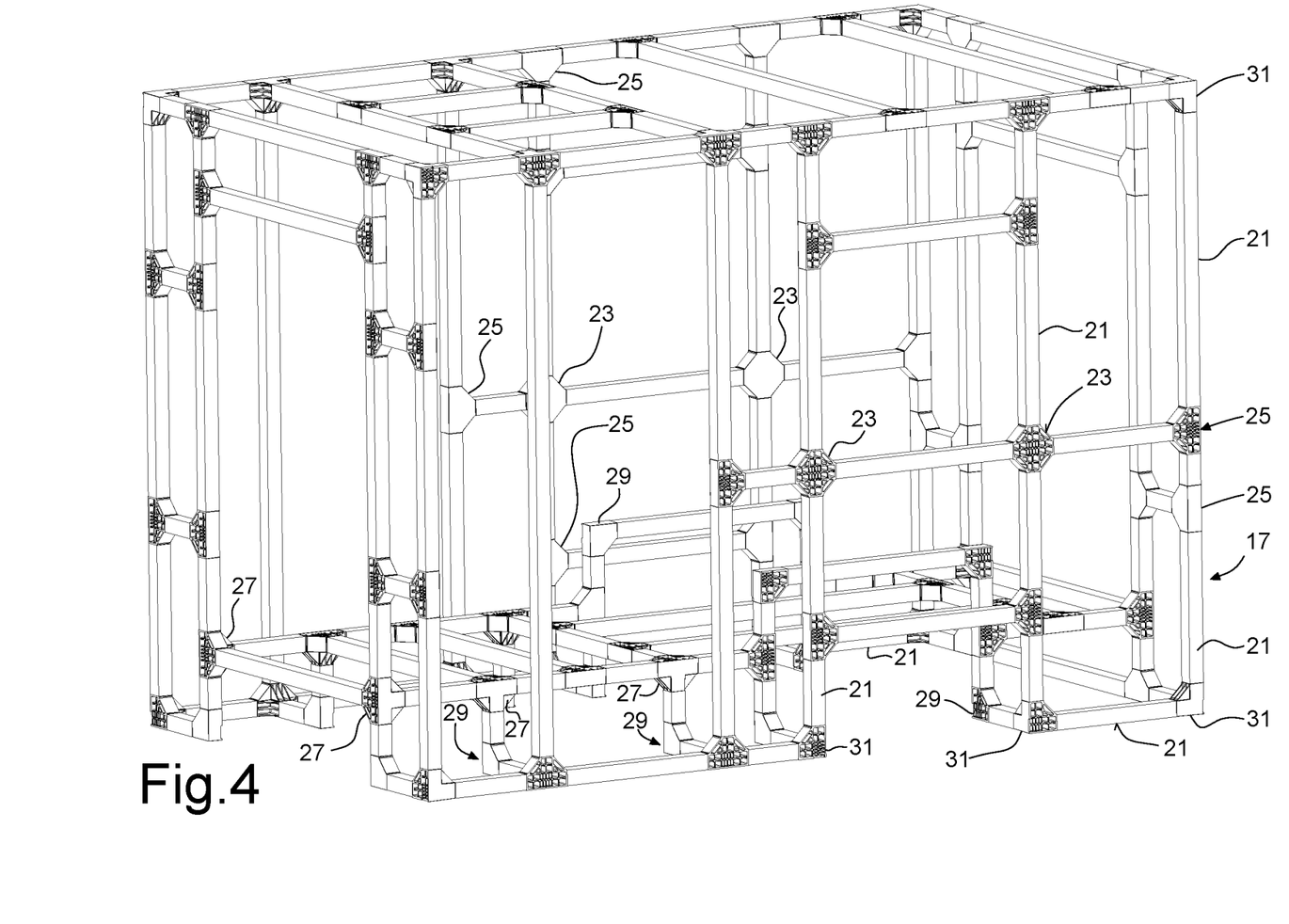
FIG. 4 shows an axonometric view of the containing structure without panels, illustrating the supporting frame of the containing structure.

The cell or containing structure 13 comprises in general a skeleton, consisting of a frame, an embodiment of which is illustrated in axonometric view in FIG. 4. The skeleton or frame, indicated as a whole with 17 in FIG. 4, can be clad with inner and outer panels, indicated schematically with 19A and 19B in FIG. 3, where a partial sectional view of a fragment of the cell or containing structure 13 is shown. The reference number 20 indicates an insulation with heat and/or sound insulation capacities.

The panels 19A, 19B can be made of polymer material, for example of polyester. In other embodiments, the panels 19A, 19B can be made of fiberglass or of aluminum.

The skeleton or frame 17 of the containing structure 13 is formed with a system comprising segments of a tubular profile and joints or nodes connecting the segments of tubular profile. In the diagram of FIG. 4 reference number 21 generically indicates the segments of tubular profile, which can be made of aluminum. In other embodiments, the tubular profiles can be made of other materials, for example of a polymer, preferably a polymer charged with reinforcing fibers, such as carbon fibers or glass fibers. Examples of polymer-based materials that can be used for the tubular profiles and for the joints or nodes will be indicated below. In the embodiment illustrated, the profile from which the segments 21 are obtained has a quadrangular, rectangular or square cross section. The choice of the cross section of the tubular profiles can be based on the type of intended use of the structure and the vehicle on which the structure is mounted.

The segments of tubular profile 21 are advantageously rectilinear, so that each segment 21 can be obtained by cutting a single semi-finished product, i.e., a rectilinear profile.

In the embodiment illustrated, the system to build the skeleton or frame 17 of the containing structure 13 comprises five types of joints that are used to join, according to angles of 90°, segments of tubular profile 21 converging in a same node. The single joints are represented in the following figures, which will be described in detail below:

first joint: X-shaped angular joint indicated with 23, represented in FIGS. 5 to 8 second joint: T-shaped angular joint indicated with 25, represented in FIGS. 9 to 13 third joint: four-way angular joint 27, represented in FIGS. 14 to 18 fourth joint: L-shaped angular joint 29, represented in FIGS. 19 to 22 fifth joint: three-way angular joint 31, represented in FIGS. 23 to 27.

In general, the joints 23, 25, 27, 29, 31 can be made of plastic material, i.e., polymer-based material, optionally charged or reinforced. In general, the polymers that can be used are polymers suitable for metal replacement.

The choice of the material can be a function of the characteristics of mechanical strength required, of the weight of the structure and of the cost of the material. In some embodiments, it may be advantageous to use materials with higher costs and performance, hence characterized by improved parameters of mechanical strength, as they allow the total weight of the structure to be reduced.

Suitable materials to be used to produce the joints include polyamides, for example a polyamide 6.6, charged with glass fibers, with percentages by weight of glass fiber for example of between 20% and 80%, preferably between 40% and 70%, even more preferably between 50% and 65%. Materials of this type based on polyamide 6.6 with 60% by weight of glass fiber are available from Lanxess Deutschland GmbH with the trade name of Durethan® BKV 60 EF DUS097 000000 and Durethan® BKV60XF 900116. In other embodiments, a polyamide 6, charged or not charged with fibers, can be used. An example of a polymer based on uncharged polyamide 6 is available from Lanxess Deutschland GmbH with the trade name Durethan® B 30 S000000.

In other embodiments, a blend of different polymers, with or without a charge of reinforcing fibers, can be used. For example, polymers based on polyethylene terephthalate (PET) and polybutylene terephthalate (PBT), optionally with reinforcing fibers, for example glass fibers, for example present in a percentage of between 20% and 70% by weight, preferably between around 30% and around 60%, more preferably between around 40% and 50% by weight, can be used. A material of this type is available from Lanxess Deutschland GmbH, with the trade name of Pocan® T 7391 0000000.

Other embodiments can use different polymers. For example, in some embodiments polyphenylene sulfide, for example one of the products marketed with the trade name Fortron® PPS by Celanese Corporation, USA, can be used.

Although in some embodiments the tubular profiles joined by the joints are made of light metal, for example of aluminum, in other embodiments at least some of the polymers indicated above can be used to produce the tubular profiles. In some cases, structures with high mechanical strength, which offer the same performance with weights lower than structures that use metal profiles, can be produced using reinforced polymers with high mechanical properties.

In advantageous embodiments, the configuration of the joints is appropriately chosen so that all the joints can be produced with a smaller number of molds with respect to the number of joints, for example by using removable inserts.

The first joint 23, or X-shaped angular joint, comprises a central core 23.1 from which four coplanar arms 23.2 angularly spaced at 90° with respect to one another, extend. Similarly to the other equivalent arms of the joints described below, the arms 23.2 form securing members of segments 21 of tubular profile converging at the joint 23.

The four arms 23.2 are configured to be inserted into ends of four segments of tubular profile 21. The cross section of the arms 23.2 corresponds approximately to the cross section of the tubular profile, but with a smaller size, to allow an adhesive material to be inserted between the lateral surfaces of each arm 23.2 and the inner surface of the segment of tubular profile 21 and for the application of additional components, in the shape of covers 33 (see FIG. 8), described in greater detail below.

In the embodiment illustrated, the tubular profiles 21 have a quadrangular section, for example measuring 40×60 mm. In other embodiments tubular profiles with a square section, for example measuring 60×60 mm, can be used. In general, the thickness of the wall of the tubular profiles can for example be between around 1.5 mm and around 5 mm, preferably between around 2 mm and around 4 mm, for example between around 2.5 mm and 3.5 mm.

The arms 23.2 of the joint have a complementary cross section, slightly smaller with respect to the cross section of the tubular profiles used. The difference in size between the two cross sections of the arms 23.2 and of the tubular profiles 21 that must be coupled with one another allows a layer of glue to be applied between them, in the manner described below.

Figure 5:
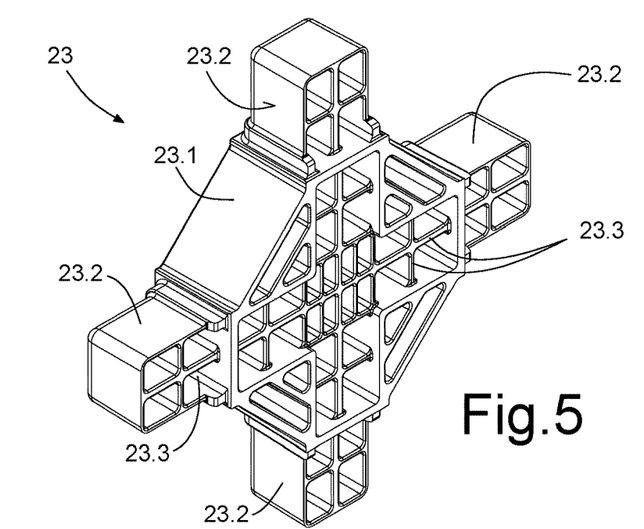
FIG. 5 shows an axonometric view of a first joint for producing the frame of the containing structure.
Figure 6:
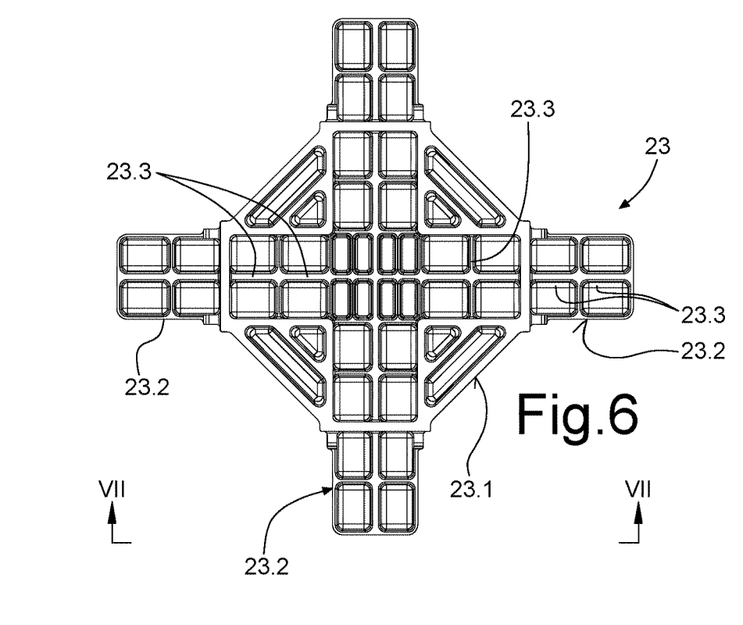
FIG. 6 shows a front view of the joint of FIG. 5.
Figure 7:
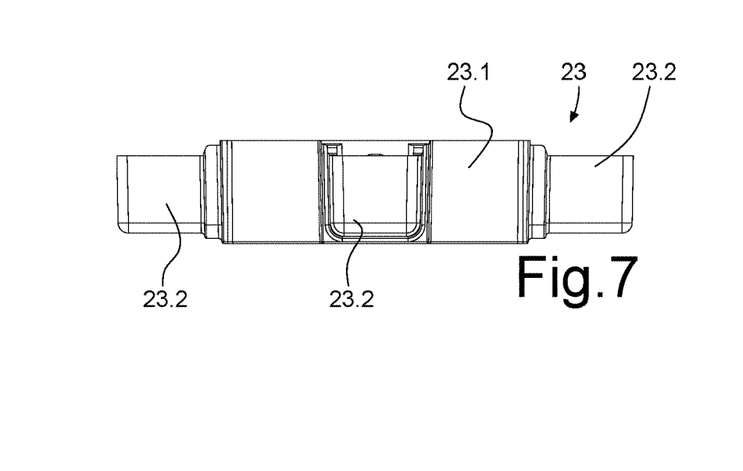
FIG. 7 shows a side view according to VII-VII of FIG. 6.
Figure 8:
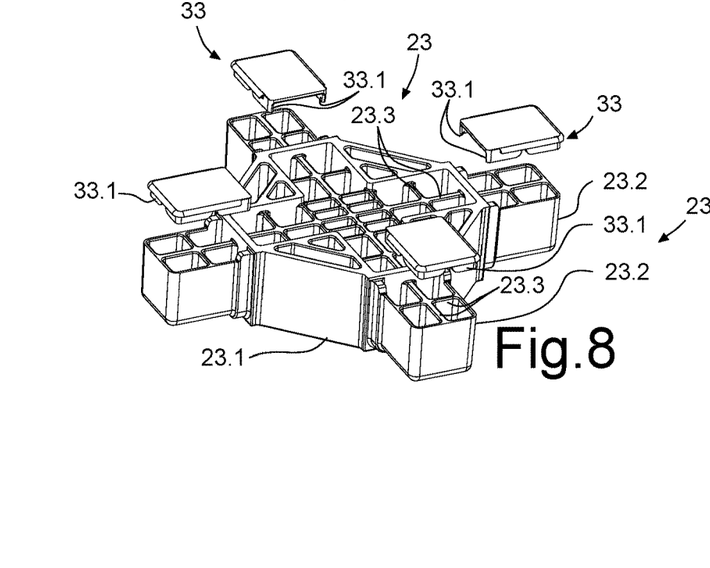
FIG. 8 shows a further axonometric view of the joint of FIGS. 5 to 7.
Figure 9:
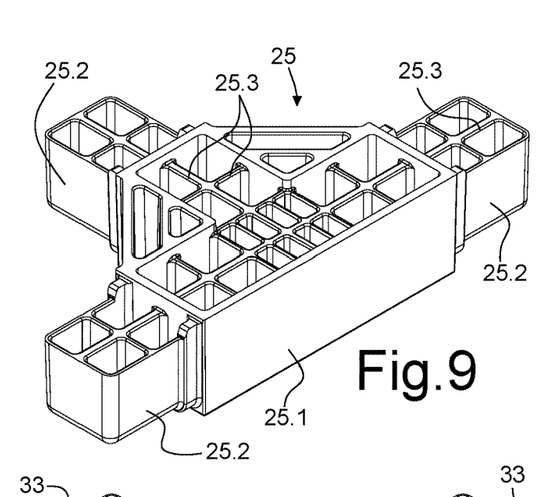
FIG. 9 shows an axonometric view of a second joint for producing the containing structure.
Figures 10, 11, 12:
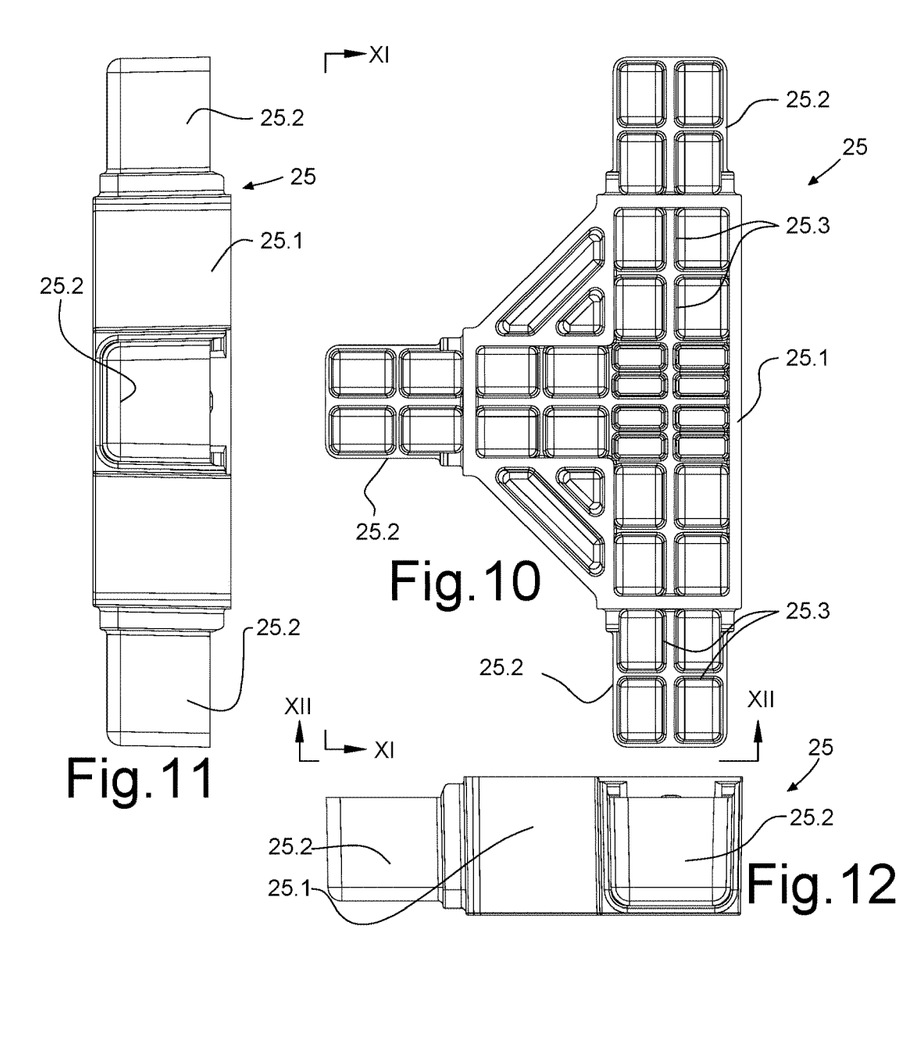
FIG. 10 shows a front view of the second joint of FIG. 9.
FIGS. 11 and 12 show side views according to XI-XI and XII-XII of FIG. 10.

As can be seen in particular from FIGS. 5, 6 and 8, both the central core 23.1 and the arms 23.2 have on the inside a lattice structure 23.3 consisting of walls intersecting one another at 90°. The lattice structure 23.3 stiffens the joint 23, maintaining a light structure and reducing the amount of material required to produce it. To enable production by molding of plastic material, a whole face of the joint 23 is advantageously open, as shown in FIGS. 5, 6 and 8. In this way, each arm 23.2 has a continuous closing surface on three sides and on the front end, and an open lower surface.

To obtain more efficient fastening of the arm in the respective terminal end of the tubular segment 21 into which the arm is inserted, covers 33 are provided, which complete the continuous outer surface of each arm, as can be understood from FIG. 8. Each cover 33 can be applied with interlock on the respective arm, for example by means of tabs 33.1 that interlock in the inner lattice structure of the arm 23.2. The thickness of each cover 33 is advantageously chosen so that once coupled to the respective arm 23.2, the cross section of the arm becomes substantially the same as the inner section of the tubular profile, minus the thickness occupied by the glue with which the arm 23.2 of the joint 23 is made to adhere to the inner surface of the segment of tubular profile 21 into which said arm is inserted.

Figure 13:
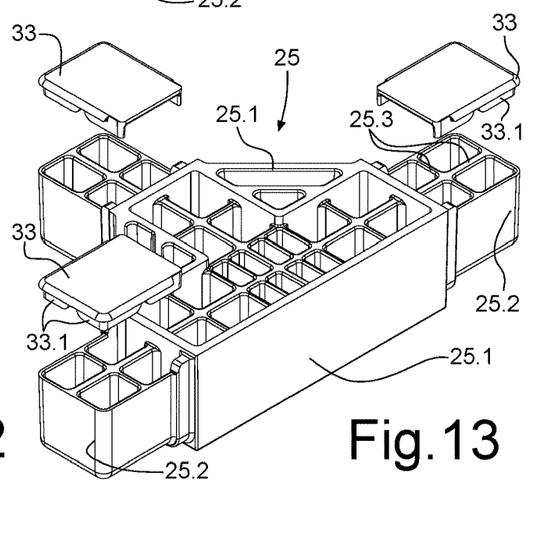
FIG. 13 shows a further axonometric view of the joint of the FIGS. 9 to 12.
Figure 14:
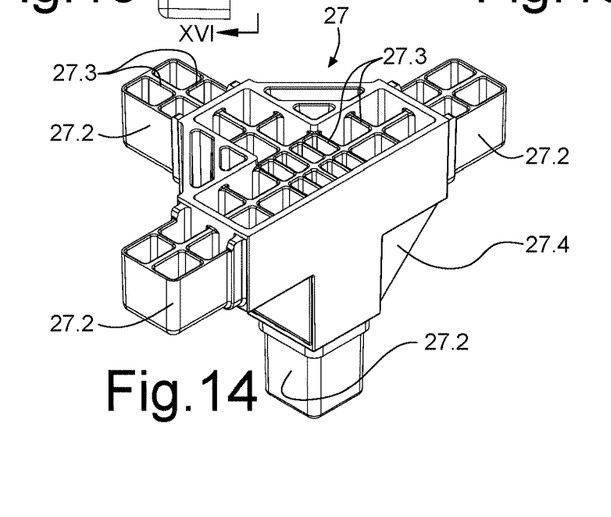
FIG. 14 shows an axonometric view of a third joint for producing the containing structure.
Figure 15:
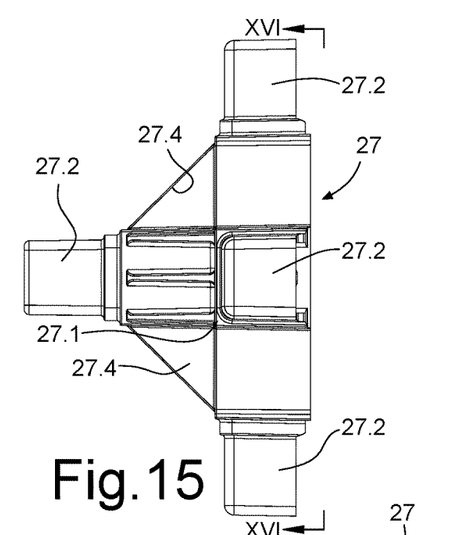
FIG. 15 shows a front view according to the line XV-XV of FIG. 17 of the third joint.
Figure 16:
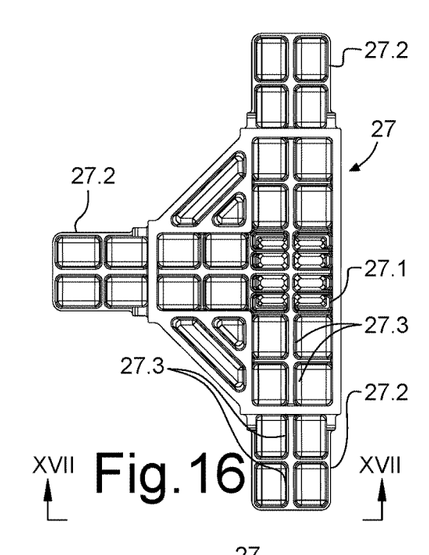
FIG. 16 shows a view according to the lines XVI-XVI of FIGS. 15 and 17.
Figure 17:
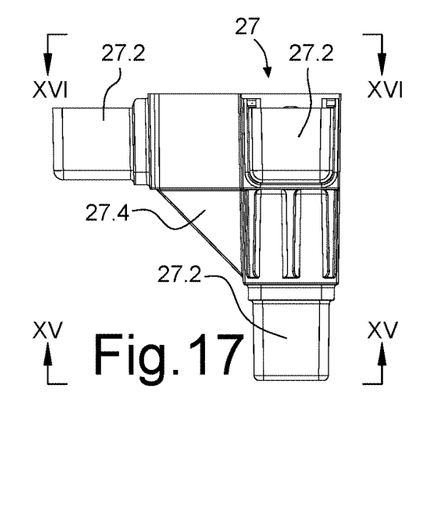
FIG. 17 shows a view according to the line XVII-XVII of FIG. 16.
Figure 18:
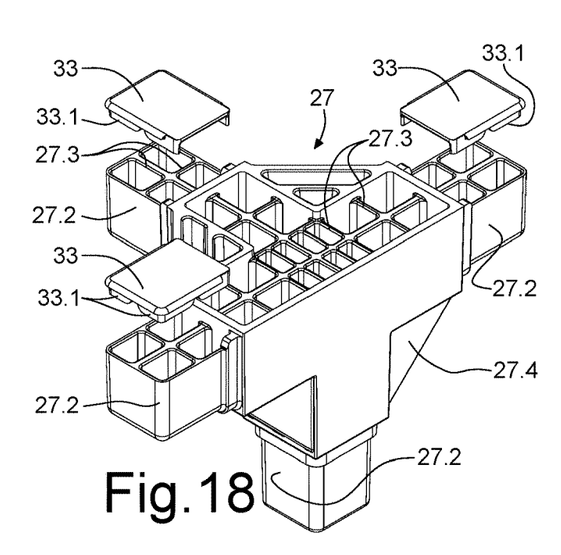
FIG. 18 shows an axonometric view of the joint of FIGS. 14 to 17 with covers to be applied on the respective arms.
Figure 19:
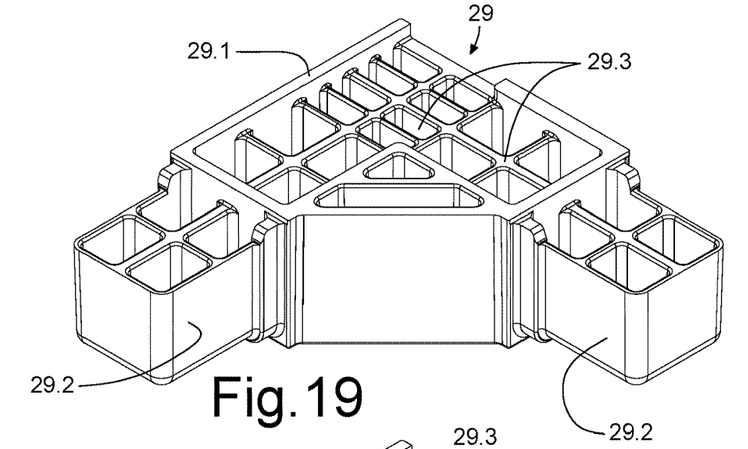
FIG. 19 shows a fourth joint for producing the containing structure.
Figure 20:
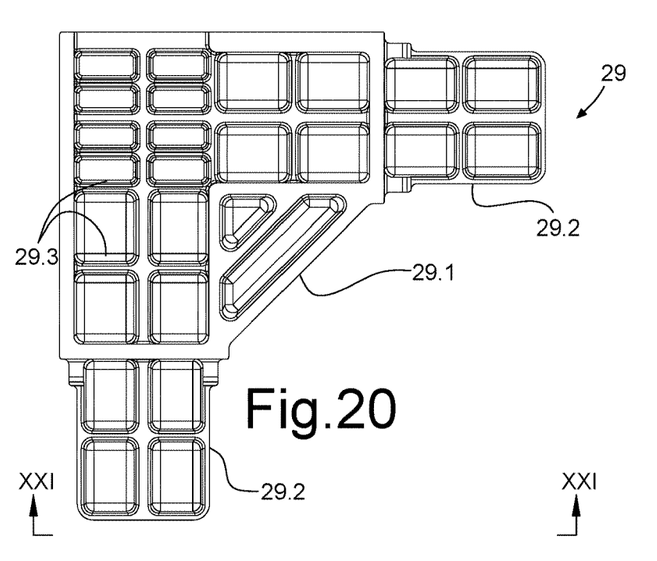
FIG. 20 shows a view according to the line XX-XX of FIG. 21 of the fourth joint.
Figure 21:
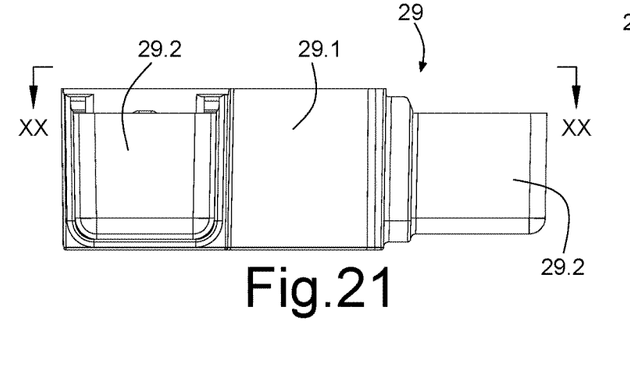
FIG. 21 shows a view according to the line XXI-XXI of FIG. 20.

The structure of the remaining joints 25, 27, 29, 31 is conceptually similar to that of the joint 23. In particular, the T-shaped joint 25, shown in FIGS. 9 to 13, has a central core 25.1 from which three T-shaped arms 25.2 extend. The inside of the central core 25.1 and of the arms 25. 2 has a lattice lightening and stiffening structure 25.3. FIG. 13 shows three covers 33 adapted to be coupled to the arms 25.2 to complete the continuous outer surface of said arms.

The joint 27 shown in FIGS. 14 to 18 has, similarly to the joints 23 and 25, a central core 27.1 and arms 27.2 that extend from the central core 27.1. The reference number 27.3 indicates a lattice structure that fills the inner volume of the core 27.1 and of the arms 27.2 for the purposes described above in relation to the inner lattice structure of the joints 23 and 25. The number 27.4 indicates reinforcing gussets that join the arms 27.2 to the central core 27.1.

Three arms 27.2 are arranged coplanar in the shape of a T, similarly to the three arms of the joint 25. The fourth arm is placed orthogonally to the plane on which the three T-shaped arms lie. Covers 33 can also be applied on the arms 27.2 of the joint 27, as described above.

Figure 22:
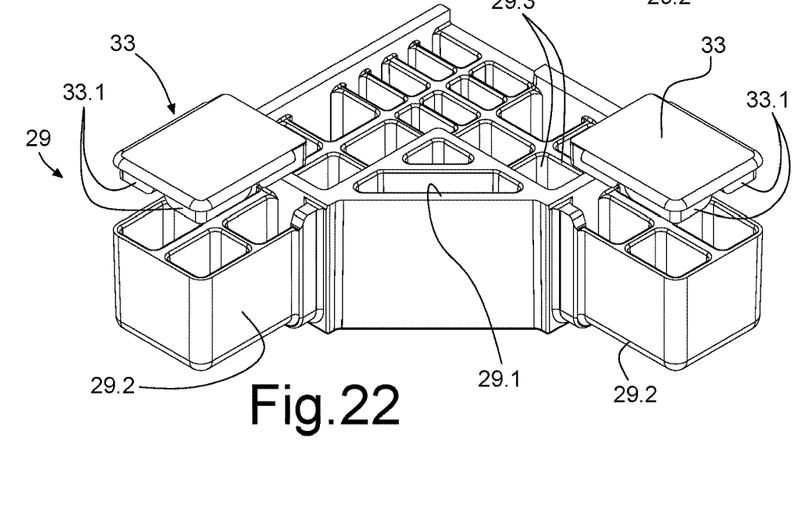
FIG. 22 shows a further axonometric view of the fourth joint of FIGS. 19 to 21.

The joint 29 has an L-shape with a core 29.1 from which two arms 29.2 extend oriented at 90° with respect to one another. The inside of the core 29.1 and of the arms 29.2 has a lattice structure 29.3 of diaphragms orthogonal to one another with the function of lightening and stiffening the joint, as described above. FIG. 22 shows an axonometric bottom view of the joint 29 with covers 33 applicable on the faces of the arms 29.2 open toward the inside, to form, as described above for the other joints illustrated, a continuous outer surface of the arms 29.2.

The joint 31 shown in FIGS. 23 to 27 has a central core 31.1 with three arms 31.2 that extend according to three orthogonal axes from the core 31.1. The inside of the arms 31.2 and of the central core 31.1 is filled with a lattice structure 31.3 similar to the lattice structure described with reference to the previously described joints and with similar filling and stiffening functions. The number 31.4 indicates reinforcing gussets between the core 31.1 and the arms 31.2.

Figures 23, 24:
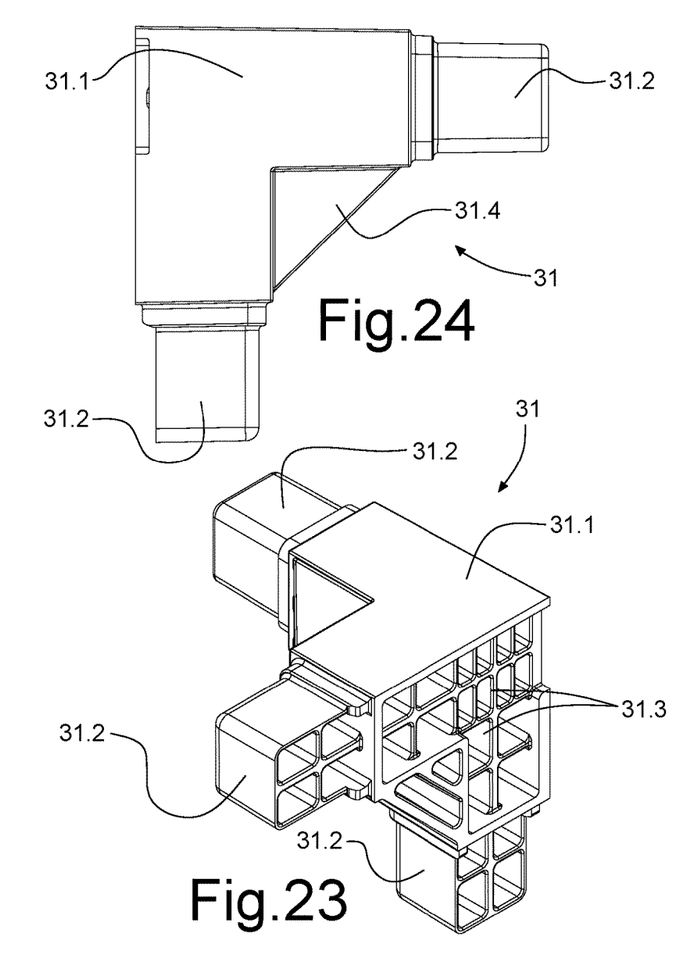
FIG. 23 shows an axonometric view of a fifth joint for producing the containing structure.
FIG. 24 shows a side view of the fifth joint of FIG. 23, according to the line XXIV-XXIV of FIG. 25.
Figure 25:
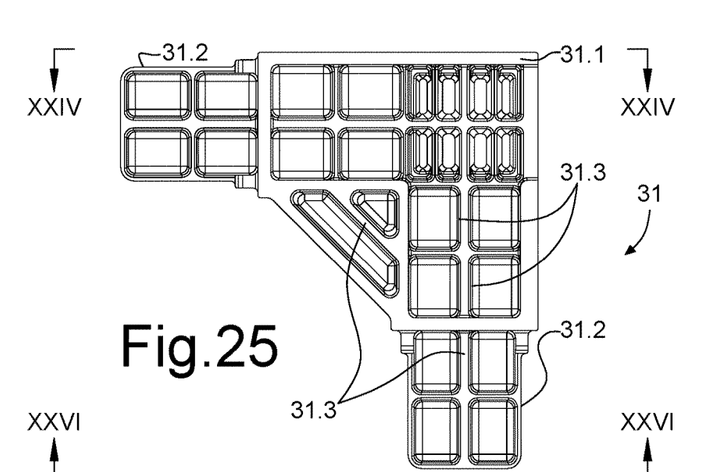
FIG. 25 shows a front view of the fifth joint of FIG. 23, according to the line XXV-XXV of FIG. 26.
Figure 26:
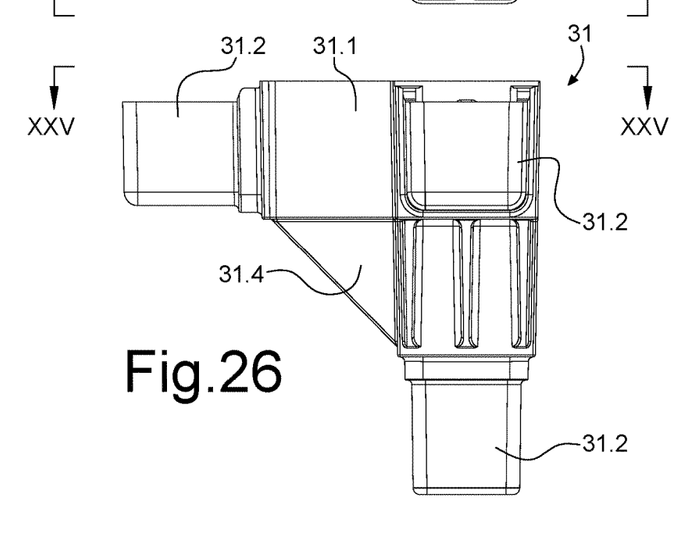
FIG. 26 shows a view of the fifth joint according to the line XXVI-XXVI of FIG. 25.
Figure 27:
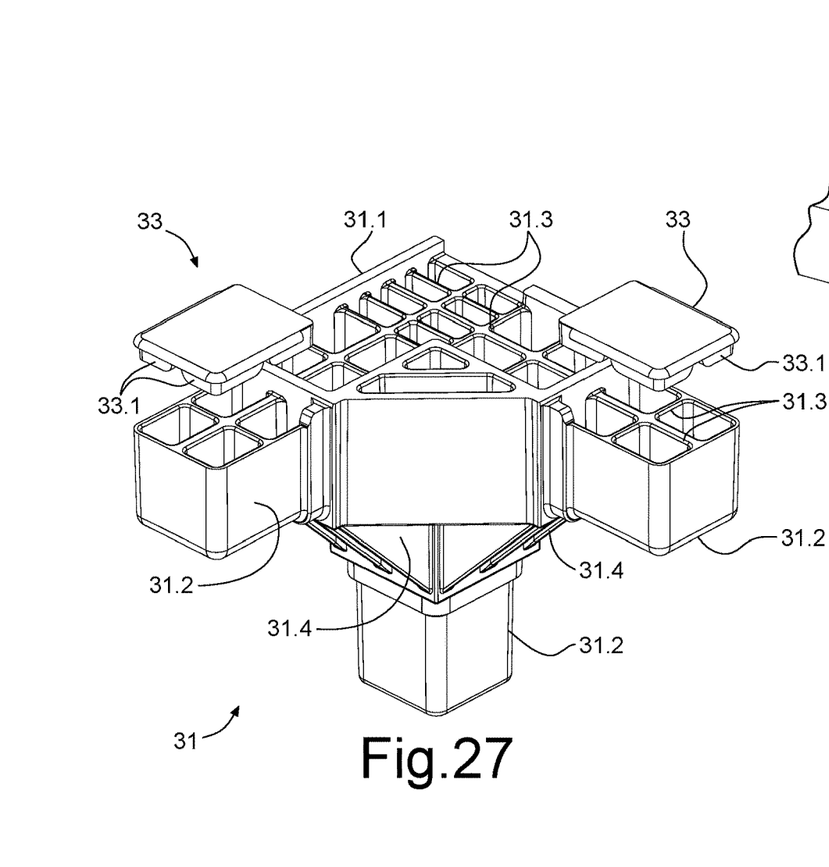
FIG. 27 shows a further axonometric view of the fifth joint.

Two coplanar arms 31.2 of the joint 31 are open on one side, as is visible in particular in FIGS. 23, 27. Covers 33 (FIG. 27) can be applied on the open faces of the arms to form a closed lateral surface with continuous contact with the inner surfaces of the segments of tubular profile 21 inserted on the arms 31.2. Just as for the joint 29, also for the joint 31 one of the arms can be made by molding with continuous and closed lateral surfaces (see arm 31.2 facing downward in FIG. 27).

Figure 28:
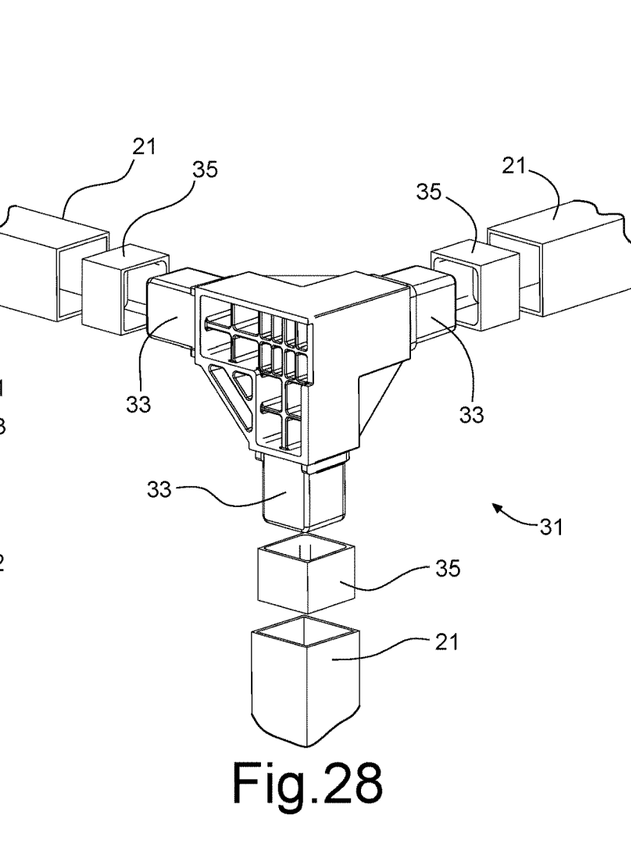
FIG. 28 shows an explanatory axonometric view of the assembly method of three tubular elements converging in a joint of the type illustrated in FIGS. 23 to 27.

Fastening of the segments of tubular profile 21 to the joints 23, 25, 27, 29, 31 is obtained in the same way for all the joints. FIG. 28 schematically shows the use of a joint 31 for mutually fastening three segments of tubular profile 21 converging in a node of the skeleton or frame 17. Fastening is advantageously obtained by gluing between the outer surfaces of the arms 31.2 (i.e., of the equivalent arms 23.2, 25.2 27.2, 29.2 for the joints 23, 25, 27, 29) and the inner surfaces of the segments 21 of tubular profile. For this purpose, as described above, the openings left open on one side of each arm, required by the technique of producing the joint by molding, are closed by means of the covers 33.

In FIG. 28 two covers 33 are applied on the corresponding open faces of two arms 31.2. The reference number 35 indicates a layer of glue that is interposed between the continuous lateral surfaces of the arms 31.2 and the inner surfaces of the segments 21 of tubular profile.

The glue can advantageously be a two-component adhesive. To facilitate application and obtain a more even distribution of glue on the whole of the interface between each arm of the joint and the respective inner surface of the corresponding segment of tubular profile 21, the glue can be applied by impregnating a strip of textile material with this glue and then applying it on the lateral surfaces of the arms 31.1 before their insertion into the ends of the segments 21 of tubular profile. Purely to simplify the schematic representation in FIG. 28, the glue 35 is shown as if it were composed of a hollow prismatic body, but in actual fact it can be formed of turns of tape impregnated with glue wound around the respective arm of the joint.

With only the five types of joint described above, it is possible to obtain a very complex skeleton or frame 17, as shown in FIG. 4. By way of example, fourteen L-shaped joints 29, twelve three-way joints 31, sixteen four-way joints 27, four X-shaped joints 23 and fifty-eight T-shaped joints 25 are used in a structure of this type.

Assembly of the skeleton or frame 17 obtained with the system consisting of the segments 21 of tubular profile and of the five joints 23, 25, 27, 2, 31 is extremely rapid and does not require to be performed by particularly skilled personnel, as is instead necessary in order to produce skeletons with welded profiles. The saving obtained in the mounting step offsets and overcomes the greater production cost of the single components, which is influenced by the cost of molding of the joints, in terms of material and of molds. Moreover, as is understood from the figures described above, to obtain the five joints 23, 25, 27, 29, 31 three separate molds and appropriate inserts are sufficient. In fact, the joints 29 and 31 can be produced with the same mold, and also the joints 23 and 25 can be produced with a respective single mold.

The system of joints and segments of profile described can be used to produce frames of containing structures destined for a wide variety of uses. For example and in particular, but not exclusively, with the system described it is possible to produce cells for ambulances, but also for other types of vehicles, such as mobile workshops, mobile offices or the like.

The invention claimed is:

1. A system for assembling a frame for a containing structure adapted to be mounted on a vehicle chassis, the system comprising:
a plurality of joints each having a central core and a plurality of arms extending from the central core and forming securing members for a respective plurality of segments of tubular profile;
a plurality of segments of tubular profile, wherein:
the arms and the segments of tubular profile have a quadrangular cross section;
the joints are made of a molded polymer material;
the central core and the arms of each joint have an inner volume filled by a lightening and stiffening lattice structure;
at least some arms comprise a closing cover configured to close an open face of the arm and to form, with remaining faces of the arm, a continuous outer surface configured to be introduced into a respective tubular profile;
an outer cross section of the arm is smaller than an inner cross section of the tubular profile, to accommodate a layer of glue between the outer surface of the arm and an inner surface of the tubular profile.

2. The system of claim 1, wherein the joints are made of a molded polymer material charged with reinforcing fibers.

3. The system of claim 1, further comprising one or more of the following:
L-shaped joints with two arms oriented at 90° with respect to each other;
X-shaped joints with four coplanar arms oriented at 90° with respect to one another;
T-shaped joints with three coplanar arms;
joints with three arms arranged according to three Cartesian axes;
four-way joints with three arms arranged coplanar in the shape of a T and a fourth arm extending orthogonally to the plane on which the three coplanar arms lie.

4. The system of claim 1, wherein at least some of said joints comprise reinforcing gussets between the core and at least one of the arms extending from the core.

5. The system of claim 1, wherein the segments of tubular profile are made of a material selected from the group comprising: a metal, in particular aluminum, a polymer or polymer blend, a polymer or polymer blend reinforced with fibers, in particular glass fibers.

6. A frame of a containing structure having a three-dimensional configuration, adapted to be mounted on a vehicle chassis, the frame comprising:
a plurality of segments of tubular profile joined to one another at a plurality of nodes of the frame to form said three-dimensional configuration by means of a plurality of joints of a system, wherein each joint has a central core and a plurality of arms extending from the central core and forming securing members for a respective plurality of segments of tubular profile, wherein:
the arms and the segments of tubular profile have a quadrangular cross section;
the joints are made of a molded polymer material;
the core and the arms of the joints have an inner volume filled by a lightening and stiffening lattice structure;
at least some of the arms of said joints are provided with a closing cover which closes an open face of the arm and forms, with remaining faces of the respective arm, a continuous outer surface;
each of the plurality of nodes of the frame is defined by one of said joints; and
all the segments of tubular profile converging in each of the plurality of nodes are joined to one another by the respective joint defining one of said plurality of nodes by a layer of glue accommodated between an inner surface of the tubular profile and the continuous outer surface of the respective arm.

7. The frame of claim 6, further comprising cladding panels attached internally to the frame, externally to the frame or both internally and externally to the frame.

8. The frame of claim 7, further comprising an insulation between an inner cladding and an outer cladding of the frame.

9. A vehicle comprising a chassis and a containing structure, the containing structure comprising a frame with a plurality of nodes, the containing structure comprising a three-dimensional configuration, comprising a plurality of segments of tubular profile joined to one another to form said three-dimensional configuration by means of a plurality of joints, wherein each joint comprises a central core and a plurality of arms extending from the central core and forming securing members for a respective plurality of segments of tubular profile, wherein the arms and the segments of tubular profile have a quadrangular cross section, wherein the joints are made of a molded polymer material, wherein the core and the arms of joints have an inner volume filled by a lightening and stiffening lattice structure, wherein at least some of the arms of said joints are provided with a closing cover which closes an open face of the arm and forms, with remaining faces of the respective arm, a continuous outer surface, wherein each of the plurality of nodes of the frame is defined by one of said joints, wherein all the segments of tubular profile converging in each of the plurality of nodes are joined to one another by the respective joint defining one of said plurality of nodes by a layer of glue accommodated between an inner surface of the tubular profile and the continuous outer surface of the respective arm.

10. A method for forming a three-dimensional frame including a plurality of nodes and delimiting an inside volume of a containing structure, the method comprising the step of joining segments of tubular profile to one another by means of connection joints of a system comprising a plurality of joints each having a central core and a plurality of arms extending from the central core and forming securing members for a respective plurality of segments of tubular profile, wherein the arms and the segments of tubular profile have a quadrangular cross section, wherein the joints are made of a molded polymer material, wherein the core and arms of the joints have an inner volume filled by a lightening and stiffening lattice structure, wherein at least some of the arms of said joints are provided with a closing cover which closes an open face of the arm and forms, with remaining faces of the respective arm, a continuous outer surface, wherein each of the plurality of nodes of the three-dimensional frame is defined by a respective joint that joins the segments of tubular profile converging in the respective node by a layer of glue accommodated between an inner surface of the tubular profile and the continuous outer surface of the respective arm.

11. The method of claim 10, further comprising the step of applying outer cladding panels to the three-dimensional frame.

12. The method of claim 11, further comprising the step of applying inner cladding panels to the three-dimensional frame.

13. The method of claim 12, further comprising the step of inserting insulation between the outer cladding panels and the inner cladding panels, said insulation providing heat and/or sound insulation.

14. The method of claim 10, wherein at least some of said joints comprise reinforcing gussets between the core and at least one of the arms extending from the core.

15. The vehicle of claim 9, wherein at least some of said joints comprise reinforcing gussets between the core and at least one of the arms extending from the core.

16. The frame of claim 6, wherein at least some of said joints comprise reinforcing gussets between the core and at least one of the arms extending from the core.

17. The system of claim 1, wherein the lightening and stiffening lattice structure comprises walls located in an interior space of one of the arms, the closing cover comprising a plurality of tabs extending from an inner surface thereof, the tabs interlocking with the walls to connect the cover to the lightening and stiffening lattice structure.

18. The system of claim 17, wherein each of the tabs extends in an opening defined by the walls.

19. The frame of claim 6, wherein the cover comprises an outer surface, the outer surface being free of openings, the outer surface being located in an interior space of one of the segments.

* * * * *